Feb. 9, 1960
H. H. BEAVIS
2,923,951
DRIVE RELEASE MEANS FOR PIPE THREADERS
Filed June 13, 1956
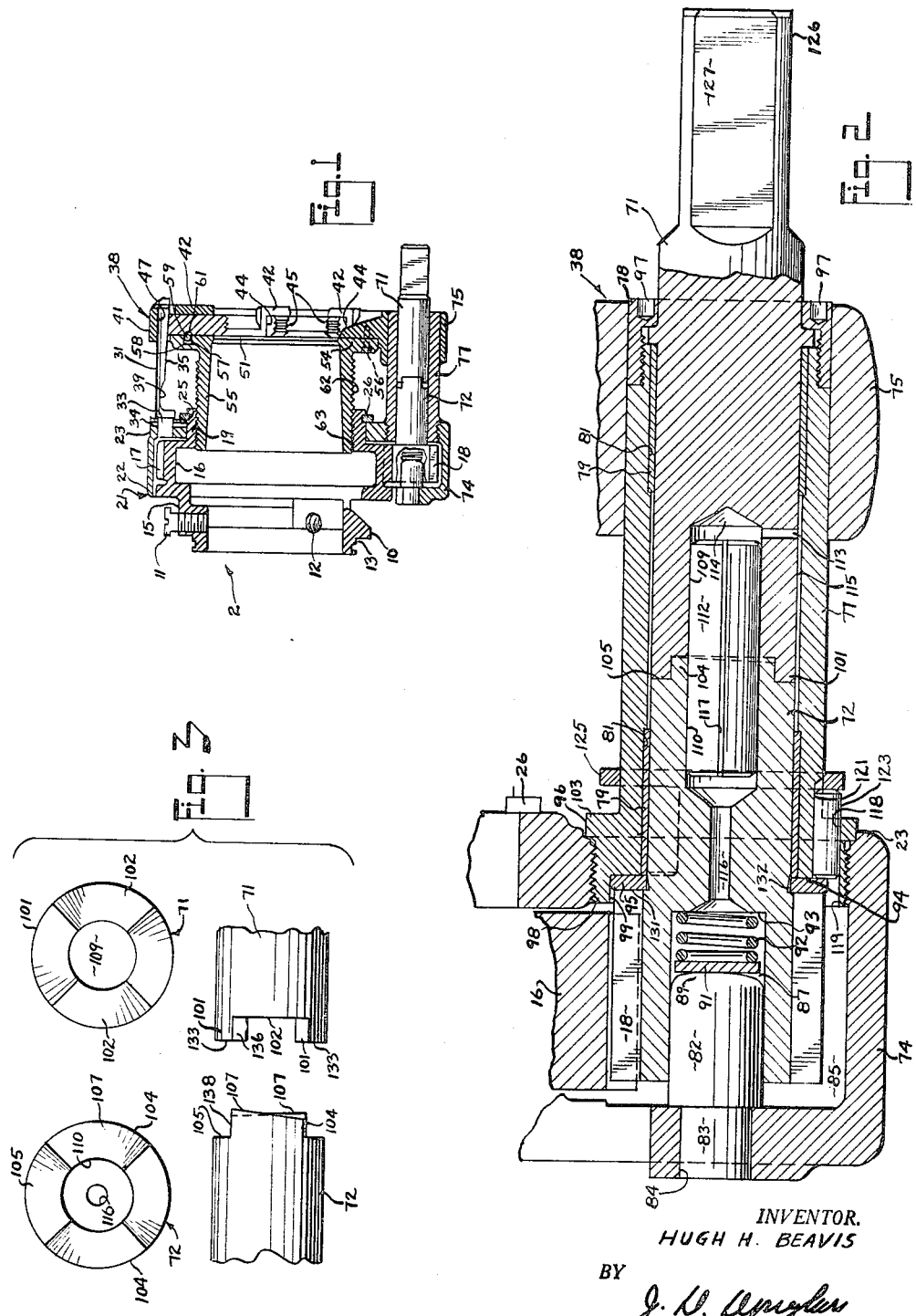
INVENTOR.
HUGH H. BEAVIS
BY
J. D. Douglas
HIS ATTORNEY

United States Patent Office 2,923,951
Patented Feb. 9, 1960

2,923,951

DRIVE RELEASE MEANS FOR PIPE THREADERS

Hugh H. Beavis, deceased, late of Elyria, Ohio, by Grace M. Beavis, Elyria, Ohio, administratrix, assignor to Ridge Tool Company, Elyria, Ohio, a corporation of Ohio Application June 13, 1956, Serial No. 591,240

11 Claims. (Cl. 10—105)

This invention relates to threading dies and more particularly to a drive therefor that is automatically releasable upon the completion of a thread cutting cycle.

In prior art devices of this class, it has been necessary for the operator to stop the drive mechanism near the end of a thread cutting cycle in order to prevent clashing and subsequent seizure between the moving and fixed elements of said device.

As a result, due to the discretion of the operator, oftentimes the drive mechanism is removed too soon wherein an insufficient length of thread is placed on the work piece, or the drive mechanism is operative for too long a period whereby the threading die is damaged or destroyed.

By the present invention, there is provided a releasable drive mechanism incorporated into the threading die that is capable of stopping the movable thread cutting mechanism after a predetermined length of thread has been placed upon the work piece.

Another advantage of the present device is that the releasable drive mechanism is automatically operable, thereby enabling the operator to perform other duties during the thread cutting operation.

Still another advantage is that the drive mechanism is simple in structure thereby enabling a decided improvement to be incorporated into the ordinary threading die with a very slight increase in the cost of manufacture thereof, which is readily offset by the resulting simplicity of operation and quality of work produced.

Other advantages will be obvious by those versed in the art and a more comprehensive understanding thereof will be realized upon reference being made to the following disclosure and accompanying drawings forming a part thereof, and, in which:

Fig. 1 is a sectional view, shown partly in elevation, of a threading die embodying the present invention; and, Fig. 2 is an enlarged fragmentary view, shown partly in elevation of the novel drive mechanism of the present invention; and Fig. 3 is a composite view showing the configurations of the ends of the drive and pinion shafts.

Referring now to the drawings, throughout which like elements are designated by like reference characters, the numeral 2, Fig. 1, denotes a threading tool in its entirety, adaptable to the releasable drive mechanism of the present invention, and is merely illustrative of one device into which said drive mechanism may be incorporated; other structures being readily ascertainable.

The device includes a work holder which comprises a frame 10 of generally circular conformation having screws 11 in threaded holes 12, extending therethrough, and which project radially inward toward the axis of the frame. The end of the work holder is of reduced diameter at 13 to provide a bearing for a well known pipe gauging device (not shown) which is journalled thereon. The gauging device is adapted for engagement with the heads of the screws 11 to provide a quick and accurate means for adjusting the holder for the various specific sizes of pipe to be threaded.

The work holder is connected by legs 15 to a ring gear 16 having teeth 17 on the periphery thereof which are adapted for driving engagement with teeth 18 formed on the end of a pinion shaft 72 as hereinafter more fully described.

The ring gear 16 is provided with a reduced cylindrical barrel 19, the outer surface of which provides a bearing surface for a housing 21.

The housing 21 comprises a generally cylindrical outer portion 22 adapted to extend over and protect the ring gear 16.

The housing 21 is provided with an inwardly extending flange 23, the inner periphery of which is adapted to be seated on barrel 19, which provides a bearing support therefor. The barrel 19 is of sufficient length to extend longitudinally beyond the flange 23 and is provided with a peripheral groove 25 into which a split ring 26 is snapped. The ring 26 engages the outer surface of the flange 23 juxtaposed to said groove to hold the housing in assembled position relative to the ring gear 16, while permitting the housing to rotate on the barrel 19.

A plurality of chaser control posts 31 are secured in the housing flange 23; each post comprising a circular base portion 33 which is in press fit relationship with an opening in the housing and secured therein by a pin 34.

Extending longitudinally of the base portion 33, each of said posts is generally semi-circular in cross sectional configuration wherein the substantially flat surface 35 facing toward the axis of the threading die is inclined upwardly from a chaser holder 38 and connects with a groove 39 adjacent the base portion 33.

The chaser holder 38 comprises a frame 41 having radially extending bosses 42 on the outer face thereof, each being provided with a radially extending channel 44 in which a chaser 45 is movably disposed. The frame may be of any desired configuration, the one preferred being substantially circular.

A plurality of openings 47 (only one being shown), are placed in said chaser holder 38 adjacent the periphery thereof, axially of said posts 31, and into which said posts are slidably journalled. The radially extending channels 44 connect with said openings 47 thereby providing a means by which the chasers 45 may engage the chaser posts.

The inner face of the frame 41 is provided with a circular recess 51 in which the flange 54 of an exteriorly threaded sleeve 55 is disposed and secured to said frame by screws 56 that extend freely through said flange into threaded engagement with the frame.

The flange 54 covers one side of the channels 44, thus providing guideways for the chasers 45. This construction thus provides an economical manner of fabricating the chaser guideways, and enables the sleeve to be easily replaced when it becomes worn or the threads thereon are damaged.

Any desired number of chasers 45, channels 44 and associated chaser posts 31 may be provided; five of each of said numbers ordinarily being used in the structure of the present embodiment.

The flange 54 of sleeve 55 is provided with blind holes 57 in which bullet catches comprising a spring 58 and ball 59 are disposed, said ball extending into detents 61 formed in the inner face of the chaser frame 41.

The sleeve 55 is provided with exterior threads 62 which are in meshing engagement with interior threads 63 formed on the interior surface of barrel 19 of the ring gear 16.

A hollow boss 74 on the housing 21 and a hollow boss 75 on the chaser frame 41 axially spaced from boss 74 provide a journal support for the drive mechanism of the present invention, which includes a drive shaft 71 and a pinion shaft 72 releasably coupled together.

An elongated sleeve 77, Fig. 2, provides a support for the drive shaft and pinion, the sleeve having a flanged end 96 adjacent which is a threaded barrel 98, having a counterbore 99 formed therein, and an annular flange 103 is in threaded engagement in flange 23 of the housing, and the opposite end is slidably disposed in the hollow boss 75 of the chaser frame 38 providing a guide for said drive mechanism. A collar 78 in threaded engagement with the extremity of the sleeve 77 within said boss 75, retains said sleeve in its operative position. Suitable apertures 97 may be placed within collar 78 to provide means for inserting a tool for removal of said collar.

The drive shaft 71 and pinion shaft 72 extend through the sleeve 77, and bearings 79 disposed in annular grooves 81 on the ends of said sleeve 77 provide bearing support for said shafts.

A cylindrical post 82, having one end 83 of reduced diameter disposed in a hole 84 in the boss 75, extends into the cavity 85 of boss 74 and thence into a spring chamber 87 formed axially within the end of pinion shaft 72.

The end 89 of the post 82 opposite to end 83 may be slightly rounded off to present a smooth surface to a thin circular disc 91. A spring 92 disposed in chamber 87, having one end in engagement with the side of disc 91, opposite to the end 89 of post 82, and the opposite end in engagement with the inner wall 93 of said spring chamber 87, tends to force said pinion shaft 72 into maximum coupling relationship with drive shaft 71. A ring 95 disposed over the pinion shaft 72, and secured in annular groove 132 by the end of bearing 79, is in engagement with the inner ends of the teeth 18 on shaft 72, and the annular wall 94 on the flanged end of 96 of sleeve 77 thereby providing the proper spaced relationship between said teeth and annular wall 94 and preventing seizure therebetween.

The drive shaft 71 and pinion shaft 72 are releasably coupled together by means of semi-annular-shaped tongues 101, Figs. 2 and 3, formed on the end of drive shaft 71 juxtaposed to said pinion shaft, in diametrically opposed relationship, defining similar shaped recesses 102 therebetween. Semi-annular-shaped tongues 104 are formed on the end of the pinion shaft 72, facing drive shaft 71, defining similar shaped recesses 105 therebetween. A tapered cam surface 107 is formed on each of said tongues 104; the taper on diametrically opposed tongues being slanted in opposite directions. In the embodiment shown only two tongues are formed on each shaft and is merely illustrative of one embodiment of said structure. Any desired number of tongues and corresponding recesses may be formed on said shafts.

A circular, longitudinally extending bore 109 is formed axially in the drive shaft 71, opening upon the face of said shaft 71 juxtaposed to said pinion shaft 72. A circular bore 110, of equal diameter and placement relative to bore 109, is formed in pinion shaft 72 opening upon the end of said shaft facing drive shaft 71.

A centering pin 112 is slidably disposed within said bores 109 and 110 interconnecting said shafts 71 and 72, while permitting relative longitudinal movement therebetween.

A channel 113 is formed within drive shaft 71, extending radially therethrough, interconnecting the inner end 114 of the bore 109 in drive shaft 71 to a clearance opening 115 defined by the periphery of shafts 71 and 72, inner surface of sleeve 71, and ends of bearings 79.

A longitudinally extending channel 116 is formed within pinion shaft 72 interconnecting spring chamber 87 and bore 110.

A narrow groove 117 is formed upon the outer surface of centering pin 112, extending longitudinally thereof.

A supply of suitable lubricant (not shown) disposed within cavity 85 in boss 74 of housing 21 may be distributed throughout said drive mechanism by said interconnecting channels 113, 116 and groove 117 and thereby provide sufficient lubricant to all moving parts thereof.

Said channels 113, 116 and groove 117 also connect all openings within the interior of said drive mechanism to cavity 85 through chamber 87, thereby preventing any build-up of pressure that may operate to lower the operating efficiency of said drive mechanism, or possibly prevent its operation at all.

A plurality of holes 118 are placed in the flanged end 96 of sleeve 77, one end connecting with groove 119 in barrel 98, and the opposite end being connected to groove 121 formed in said sleeve adjacent the annular ring 103. Said holes 118 are in equal spaced relationship radially about said flanged end 96; the number thereof being entirely discretionary. The drive mechanism is operative when only one hole 118 and associated elements are provided; the efficiency of the drive mechanism being greater when two or more are used. In the present embodiment three holes 118 are provided.

A cylindrical pin 123 is placed into each of said holes 118, and is freely slidable therein, one end of each pin extends into groove 119 in barrel 98 and is adapted to engage ring 95. The opposite end of each pin extends into groove 121 and is adapted to be engaged by ring 125 which is slidable over the outer surface of the sleeve 77.

In the normal coupled relationship of drive shaft 71 and pinion shaft 72, the tongues 101 of shaft 71 are substantially completely disposed in recesses 105 of shaft 72, and tongues 104 of shaft 72 are similarly disposed in recesses 102 of shaft 71.

The end 126 of drive shaft 71, extending outwardly of boss 75 on the chaser frame 41, may partake of any desired configuration to enable a source of rotative power to be attached thereto and thereby provide the required force to drive shaft 71. Merely for purposes of illustration, the end 126 of shaft 71, Fig. 2, is shown to have at least one flat surface 127 which is adapted to mate with a similarly shaped connection on a drive source to enable transfer of power therebetween.

In operation, the pipe or work piece is held by a vise, or similarly operative device with the end to be threaded being in free extension thereof.

The threading die 2 is placed over the free end of said work piece in such manner that the extremity of said work piece is adjacent the chasers 45.

The screws 11 in frame 10, are then adjusted to properly secure the work piece in the die; the gauging device (not shown) determining the proper adjustment for said screws.

A source of rotative power is then connected to the end 126 of drive shaft 71 whereby said shaft is rotatably driven within its bearing 79 and sleeve 77 support. Said power is transmitted to the pinion shaft 72 through the coupling means provided by tongues 101 and 104 on said shafts 71 and 72.

The teeth 18 formed on said pinion shaft 72 mesh with teeth 17 of ring gear 16, whereby said drive mechanism travels around the periphery of said ring gear rotatably carrying the housing 21 and chaser holder 38 connected thereto. The sleeve 55 in threaded engagement with barrel 19 moves to the left as viewed in Fig. 1, and the chasers 45 engage the end of the work piece and commence cutting threads thereon.

As the thread cutting cycle is continued, the sleeve 55 extends further into the barrel 19, carrying the chaser holder 38 and disposed thread cutting chasers 45 closer to the work holder 10. The hollow boss 75, Fig. 2, formed on said chaser frame 41, slides over the outside surface of the guide sleeve 77, and just prior to the end of the thread cutting cycle, engages ring 125.

The ring 125 is thereby moved toward the work holder 10, and engages the radially spaced pins 123 slidably disposed in the flanged end 96 of said sleeve 77. The opposite ends of said pins engage ring 95, which is in turn, in engagement with the inner edge 131 of teeth 18 on pinion shaft 72. Said pressure is thereby transmitted to the pinion shaft 72 and tends to force said shaft to the left and out of meshing engagement with the drive shaft 71. The spring 92 acting between plug 91 and inner wall 93 of the spring chamber 87 exerts a predetermined pressure in opposition to said pressure acting upon ring 125.

When several threads are yet to be formed by chasers 45, the pressure exerted upon ring 125 is sufficient to ovecome the opposing pressure exerted by spring 92, whereby the pinion shaft 72 is moved over post 82 and centering pin 112, and out of complete meshing engagement with drive shaft 71.

When the last thread has been formed upon the pipe or work piece, the pressure exerted upon ring 125, pins 123 and ring 95, is sufficient to move the pinion shaft 72 away from the drive shaft 71, whereby the annular tongues 104 of shaft 72 rise out of recesses 102 on shaft 71, and the outer edge 133 of each tongue 101 engages the cam surface 107 formed on each tongue 104, intermediate the ends of said cam surface.

Rotational movement of the pinion shaft 72, resulting from the transmission of rotative power through the drive shaft 71, is thereafter prevented by the frictional forces prevailing between the associated parts of the pinion shaft 72, housing 21 and work holder 10 which may be separately or additively sufficient to overcome said applied rotative power.

The tongues 101 on said drive shaft 71 ride up upon cam surfaces 107 on tongue 104 of pinion shaft 72, and force said pinion shaft to move away from said drive shaft, further compressing spring 92. When said tongues 101 ride off said cam surfaces 107, spring 92 exerts sufficient pressure to snap said pinion shaft 72 back toward the drive shaft 71, wherein the inner edge 131 of teeth 18 engage ring 95. In this position, the shoulders 101 will again engage the cam surfaces 107, intermediate the ends thereof on succeeding rotation of said shaft whereby the cycle is repeated. The resultant reciprocatory movement of the pinion shaft provides an audible click that may be heard by the operator and which signifies that the thread cutting cycle is ended.

The rotative source of power attached to end 126 of shaft 71 need not, therefore, be released immediately upon the completion of a thread cutting cycle for the drive shaft and pinion shaft are releasably interconnected thereby preventing locking and subsequent seizure of associated members.

The chaser frame may be withdrawn back over the threaded pipe or work piece in preparation to removing the threading tool by reversing the direction of rotation of the power applied to drive shaft 71. The tongues 101 of shaft 71 slide over the cam surfaces 107 of shaft 72 in the opposite direction whereby the pinion shaft 72 is allowed to move to the right under the influence of the pressure applied by spring 92.

When the tongues 104 of shaft 72 become interposed between tongues 101 of shaft 71 and partially disposed in recesses 102, the edge 136 of each tongue 101 engages the edge 138 on each tongue 104, whereby the oppositely operative rotative power is transmitted to said pinion shaft 72 and thence to said housing 21 and said chaser frame 41 to withdraw said chaser frame back over and out of threaded engagement with the pipe or work piece.

Therefore, it is realized that at the end of a thread cutting cycle, the drive mechanism is releasable in one direction of rotation to prevent clashing and subsequent seizure of the chaser frame and the work holder and operative in the opposite direction of rotation to transmit power to the longitudinal movable chaser frame resulting in its removal from the threaded pipe or work piece.

Having thus described one embodiment of my invention, I realize that numerous departures may be made therefrom without departing from the scope of the appended claims.

What is claimed is:

1. In a thread cutting tool which includes a work holder, a housing mounted for rotation with respect to the work holder, a rotatable driving member operative to effect rotation of the housing with respect to the work holder in response to rotation of said driving member, a sleeve connected to said housing and projecting therefrom, and a chaser holder threadedly mounted on said work holder to turn with respect to the work holder, said chaser holder being coupled to said housing to turn therewith and being slidable axially along the sleeve, the improvement which comprises a driven shaft rotatable in said sleeve and connected to said driving member, a rotary drive shaft extending into the sleeve, said shafts having inter-engaging clutch portions, and means positioned on the sleeve for engagement by the chaser holder upon predetermined movement of the chaser holder axially along the sleeve to disengage said driven shaft from the drive shaft.

2. The mechanism of claim 1 wherein there is provided spring means biasing said driven shaft into clutching engagement with the drive shaft.

3. The mechanism of claim 1, wherein said driven shaft is slidably mounted in the sleeve, and said last-mentioned means is slidably mounted on the outside of the sleeve and acts against said driving member to shift said driving member and said driven shaft axially away from the drive shaft when said last-mentioned means is displaced axially along the sleeve by the chaser holder.

4. The mechanism of claim 1, further characterized by said driven shaft being slidably mounted in the sleeve and having a conjoint axis of rotation with said drive shaft, said shafts at their adjacent ends having axially projecting tongues and recesses between said tongues, the tongues on the driven shaft having long and short opposite sides, the long sides projecting farther toward the drive shaft than the short sides, said tongues on the driven shaft presenting outer end faces between said long and short sides which incline toward the drive shaft in one direction around said axis of rotation, a spring biasing the driven shaft axially toward the drive shaft to position their respective tongues and recesses in locking engagement with one another to couple the shafts to each other for rotation in either direction about said axis, said last-mentioned means being separate from the shafts and slidable along the sleeve to retract the driven shaft axially away from the drive shaft to a position in which the tongues on the drive shaft clear said short sides of the tongues on the driven shaft and ride over said inclined outer end faces on the tongues on the driven shaft when the drive shaft rotates in one direction about said axis and in which the tongues on the drive shaft engage said long sides of the tongues on the driven shaft and couple the shafts to each other for rotation together when the drive shaft rotates in the opposite direction.

5. In a thread cutting tool which includes a work holder carrying a ring gear and an internally threaded barrel portion, a housing mounted for rotation about the work holder, a pinion rotatably mounted on the housing and meshing with said ring gear to cause the housing to turn about the work holder in response to rotation of the pinion, a sleeve connected to the housing and projecting therefrom, and a chaser holder threadedly mounted on said barrel portion of the work holder to turn on the work holder and move axially along the work holder, said chaser holder being coupled to said housing to turn therewith and slidably receiving the sleeve to slide axially along the sleeve as it turns on the work holder in unison with the housing and moves axially along the work holder, the improvement which comprises a pinion shaft connected to the pinion and slidably and rotatably received in the sleeve, a rotary drive shaft extending into the sleeve, said shafts having inter-engaging clutch portions on their adjacent ends within the sleeve, a ring slidably mounted on the outside of the sleeve and positioned to be engaged by the chaser holder when the chaser holder moves a predetermined distance axially along the sleeve, and means acting between the ring and the pinion to displace the pinion shaft axially out of clutching engagement with the drive shaft when the ring is displaced axially along the sleeve by the chaser holder.

6. The mechanism of claim 5, wherein there is provided spring means biasing the pinion shaft into clutching engagement with the drive shaft.

7. The mechanism of claim 5, wherein said last-mentioned means comprises a pin slidable along the sleeve and a ring engaged between said pin and the pinion, and wherein there is provided a spring biasing the pinion shaft into clutching engagement with the drive shaft.

8. The mechanism of claim 5, wherein the shafts have aligned axial recesses in their adjacent ends and wherein there is a centering pin slidably disposed in said recesses.

9. The mechanism of claim 5, further characterized by said shafts at their adjacent ends having axially projecting tongues and recesses between said tongues, the tongues on the pinion shaft having long and short opposite sides, the long sides projecting farther toward the drive shaft than the short sides, said tongues on the pinion shaft presenting outer end faces between said long and short sides which incline toward the drive shaft in one direction around said axis of rotation, a spring biasing the pinion shaft axially toward the drive shaft to position their respective tongues and recesses in locking engagement with one another to couple the shafts to each other for rotation in either direction about said axis, said ring and said last-mentioned means being separate from the shafts and slidable along the sleeve to retract the pinion shaft axially away from the drive shaft to a position in which the tongues on the drive shaft clear said short sides of the tongues on the pinion shaft and ride over said inclined outer end faces of the tongues on the pinion shaft when the drive shaft rotates in one direction about said axis and in which the tongues on the drive shaft engage said long sides of the tongues on the pinion shaft and couple the shafts to each other for rotation together when the drive shaft rotates in the opposite direction.

10. In a thread cutting tool which includes a work holder carrying a ring gear and an internally threaded barrel portion, a housing mounted for rotation about the work holder, a pinion rotatably mounted on the housing and meshing with said ring gear to cause the housing to turn about the work holder in response to rotation of the pinion, a sleeve connected at its inner end to the housing and projecting therefrom away from the pinion, and a chaser holder threadedly mounted on said barrel portion of the work holder to turn on the work holder and move axially along the work holder, said chaser holder being coupled to said housing to turn therewith and slidably receiving the sleeve to slide axially along the sleeve as it turns on the work holder in unison with the housing and moves axially along the work holder, the improvement which comprises a pinion shaft connected to the pinion and slidably and rotatably received in the sleeve, a rotary drive shaft extending into the sleeve, said shafts having inter-engaging clutch portions on their adjacent ends within the sleeve, spring means biasing said pinion shaft into clutching engagement with said drive shaft, a first ring slidably mounted on the outside of the sleeve and positioned to be engaged by the chaser holder when the chaser holder moves a predetermined distance axially along the sleeve, a second ring extending around said pinion shaft and engaged between the pinion and the inner end of the sleeve to prevent binding therebetween, and pin means slidably received in said inner end of the sleeve and engaged between said rings to displace the pinion shaft axially out of clutching engagement with the drive shaft when said first ring is displaced axially toward said inner end of the sleeve by the chaser holder.

11. In combination with a housing, a pinion rotatably mounted on the housing, and a sleeve connected at its inner end to the housing and projecting therefrom away from the pinion, the improvement which comprises a pinion shaft connected to the pinion and slidably and rotatably received in the sleeve, a rotary drive shaft extending into the sleeve, said shafts having inter-engaging clutch portions on their adjacent ends within the sleeve, spring means biasing said pinion shaft axially into clutching engagement with said drive shaft, a first ring slidably mounted on the outside of said sleeve for movement axially along the sleeve, a second ring extending around the pinion shaft and engaged between the pinion and said inner end of the sleeve to prevent binding therebetween, and pin means slidably received in said inner end of the sleeve and engaged between said rings to displace the pinion shaft axially out of clutching engagement with the drive shaft when said first ring is displaced axially toward said inner end of the sleeve.

References Cited in the file of this patent

UNITED STATES PATENTS

| | | |
|---|---|---|
| 915,568 | Douglas | Mar. 16, 1909 |
| 1,577,206 | Dempster | Mar. 16, 1926 |
| 1,642,490 | Decker | Sept. 13, 1927 |
| 2,429,564 | Petersen | Oct. 21, 1947 |
| 2,504,018 | Gibson | Apr. 11, 1950 |
| 2,680,861 | Ingwer et al. | June 15, 1954 |
| 2,753,575 | Ingwer | July 10, 1956 |